United States Patent
Woley et al.

(10) Patent No.: US 9,317,344 B2
(45) Date of Patent: Apr. 19, 2016

(54) POWER EFFICIENT BROKERED COMMUNICATION SUPPORTING NOTIFICATION BLOCKING

(75) Inventors: Kevin Michael Woley, Seattle, WA (US); Benjamin Salim Srour, Seattle, WA (US); Gaurav S. Anand, Seattle, WA (US); Nathan J. Kuchta, Bothell, WA (US); Benjamin D. L. Stewart, Seattle, WA (US); Evgeny Skarbovsky, Sammamish, WA (US); Donovan P. Regan, Seattle, WA (US); George Joy, Kirkland, WA (US); Darren Louie, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 13/398,260

(22) Filed: Feb. 16, 2012

(65) Prior Publication Data
US 2013/0219409 A1 Aug. 22, 2013

(51) Int. Cl.
*G06F 9/54* (2006.01)

(52) U.S. Cl.
CPC ..................................... *G06F 9/542* (2013.01)

(58) Field of Classification Search
CPC ....... H04M 15/83; G06F 1/3206; G06F 9/542
See application file for complete search history.

(56) References Cited

U.S. PATENT DOCUMENTS

| | | | |
|---|---|---|---|
| 6,763,384 B1 | 7/2004 | Gupta et al. | |
| 6,912,588 B1 | 6/2005 | Jardin et al. | |
| 7,051,330 B1 * | 5/2006 | Kaler et al. | 718/106 |
| 7,747,717 B2 | 6/2010 | Colrain | |
| 7,881,322 B1 | 2/2011 | Benveniste | |
| 8,005,912 B2 | 8/2011 | Pearce et al. | |
| 8,082,224 B2 | 12/2011 | Marinescu | |
| 8,621,026 B2 | 12/2013 | Lau et al. | |

(Continued)

FOREIGN PATENT DOCUMENTS

| | | |
|---|---|---|
| CN | 1520562 | 8/2004 |
| EP | 2148293 | 1/2010 |

OTHER PUBLICATIONS

Wilson, Jim, "The State and Notifications Broker API Part 2.", Retrieved at <<http://msdn.microsoft.com/en-us/library/bb286907.aspx#Batch Notifications>>, Oct. 6, 2010, pp. 22.

(Continued)

*Primary Examiner* — Syed Roni
(74) *Attorney, Agent, or Firm* — Jim Banowsky; Kate Drakos; Micky Minhas

(57) ABSTRACT

A notification service receives messages including various data from application services, and provides notifications including that data to the appropriate computing devices. Each computing device includes a notification system that receives notifications from the notification service and provides those notifications to the appropriate applications on the computing device. If an application is not allowed to run on a computing device, the notification system on the computing device provides an indication to the notification service to block notifications for the application on the computing device. The notification service ceases providing notifications to a computing device targeting applications for which notifications are blocked on the computing device until an indication is received from the computing device to unblock notifications for the application.

20 Claims, 6 Drawing Sheets

(56) References Cited

U.S. PATENT DOCUMENTS

| | | | |
|---|---|---|---|
| 2005/0255833 | A1 | 11/2005 | Bar-Or |
| 2005/0257149 | A1* | 11/2005 | Kamiya et al. ............... 715/700 |
| 2006/0242708 | A1 | 10/2006 | Oswall et al. |
| 2009/0249391 | A1* | 10/2009 | Klein et al. ................... 725/34 |
| 2010/0083255 | A1 | 4/2010 | Bane et al. |
| 2010/0088387 | A1 | 4/2010 | Calamera et al. |
| 2010/0130226 | A1* | 5/2010 | Arrasvuori et al. ......... 455/456.1 |
| 2011/0096709 | A1 | 4/2011 | Jeyaseelan |
| 2011/0151944 | A1 | 6/2011 | Morgan |
| 2011/0296213 | A1 | 12/2011 | Ferlitsch et al. |
| 2013/0067014 | A1 | 3/2013 | Lau et al. |

OTHER PUBLICATIONS

Warren, Tom, "Microsoft shares its plans to improve Windows 8 battery life", Retrieved at <<http://www.winrumors.com/microsoft-shares-its-plans-to-improve-windows-8-battery-life/>>, Nov. 9, 2011, pp. 7.

"Batching Notifications to Optimize for Battery Life", U.S. Appl. No. 13/229,724, filed Sep. 11, 2011, pp. 24.

"Non Final Office Action", U.S. Appl. No. 13/229,174, (Feb. 26, 2013), 4 pages.

"International Search Report", Mailed Date: Jun. 3, 2013, Application No. PCT/US2013/025797, Filed Date: Feb. 13, 2013, pp. 10.

"Push Notifications for Windows Phone Development", retrieved from<<http://create.msdn.com/en-US/education/quickstarts/push_notifications>>,(May 30, 2011),11 pages.

Naldi, et al., "Batch Delivery in Wireless Sensor Networks", *In Proc. European Wireless Conference*, retrieved from <<http://www.tkn.tu-berlin.de/publications/papers/NaldiWillig08.pdf>>,(Jun. 2008),7 pages.

Rohl, Christian et al., "A Short Look on Power Saving Mechanisms in the Wireless LAN Standard Draft IEEE 802.11", *6th WINLAB Workshop on Third Generation Wireless Systems*, retrieved from <<http://citeseerx.ist.psu.edu/viewdoc/ Ddownload?doi=10.1.1.22.7434&rep=rep1&type=pdf>>,(May 30, 2011),6 pages.

"Notice of Allowance", U.S. Appl. No. 13/229,724, (Aug. 23, 2013), 6 Pages.

"Foreign Office Action", CN Application No. 201380009589.5, Jan. 4, 2016, 21 pages.

\* cited by examiner

POWER EFFICIENT BROKERED COMMUNICATION SUPPORTING NOTIFICATION BLOCKING

BACKGROUND

As computers have become increasingly commonplace and interconnected, application services have been developed to provide various support functionality to applications running on the computers. The application services oftentimes desire to communicate messages including various data to the applications running on the computers. Allowing such communication, however, is not without its problems. One such problem is that building and maintaining application services that support persistent connections between the application services and the various instances of applications with which communication is desired can cost significant amounts of money, which can prevent application developers from creating the applications and application services they desire.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a notification service a message targeting an application on a computing device is received from an application service. A determination is made, based at least in part on a previously received indication from the computing device, whether notifications for the application on the computing device are blocked. A notification targeting the application and including data from the message is provided to the computing device only in response to determining that notifications for the application on the computing device are not blocked.

In accordance with one or more aspects, a notification targeting an application on a computing device is received from a notification service. A determination is made as to whether the application is allowed to run on the computing device (e.g., is currently running or is allowed to be started in response to receipt of the notification). If the application is allowed to run on the computing device then the notification is provided to the application. However, if the application is not allowed to run on the computing device, then a blocked indication is sent to the notification service indicating that notifications targeting the application are not to be sent to the computing device.

BRIEF DESCRIPTION OF THE DRAWINGS

The same numbers are used throughout the drawings to reference like features.

DETAILED DESCRIPTION

Power efficient brokered communication supporting notification blocking is discussed herein. A notification service receives messages including various data from one or more application services, and provides notifications including that data to the appropriate computing devices. Each computing device includes a notification system that receives notifications from the notification service and provides those notifications to the appropriate applications on the computing device. Situations can arise in which an application is not allowed to run at a particular time on a computing device (e.g., because the application is not running at that particular time and is not permitted to run as a background application). The notification system on the computing device provides an indication to the notification service to block notifications for an application on the computing device if the application is not allowed to run on the computing device. Notification system ceases providing notifications to a computing device targeting applications for which notifications are blocked on the computing device until an indication is received from the computing device to unblock notifications for the application.

Figure 1:
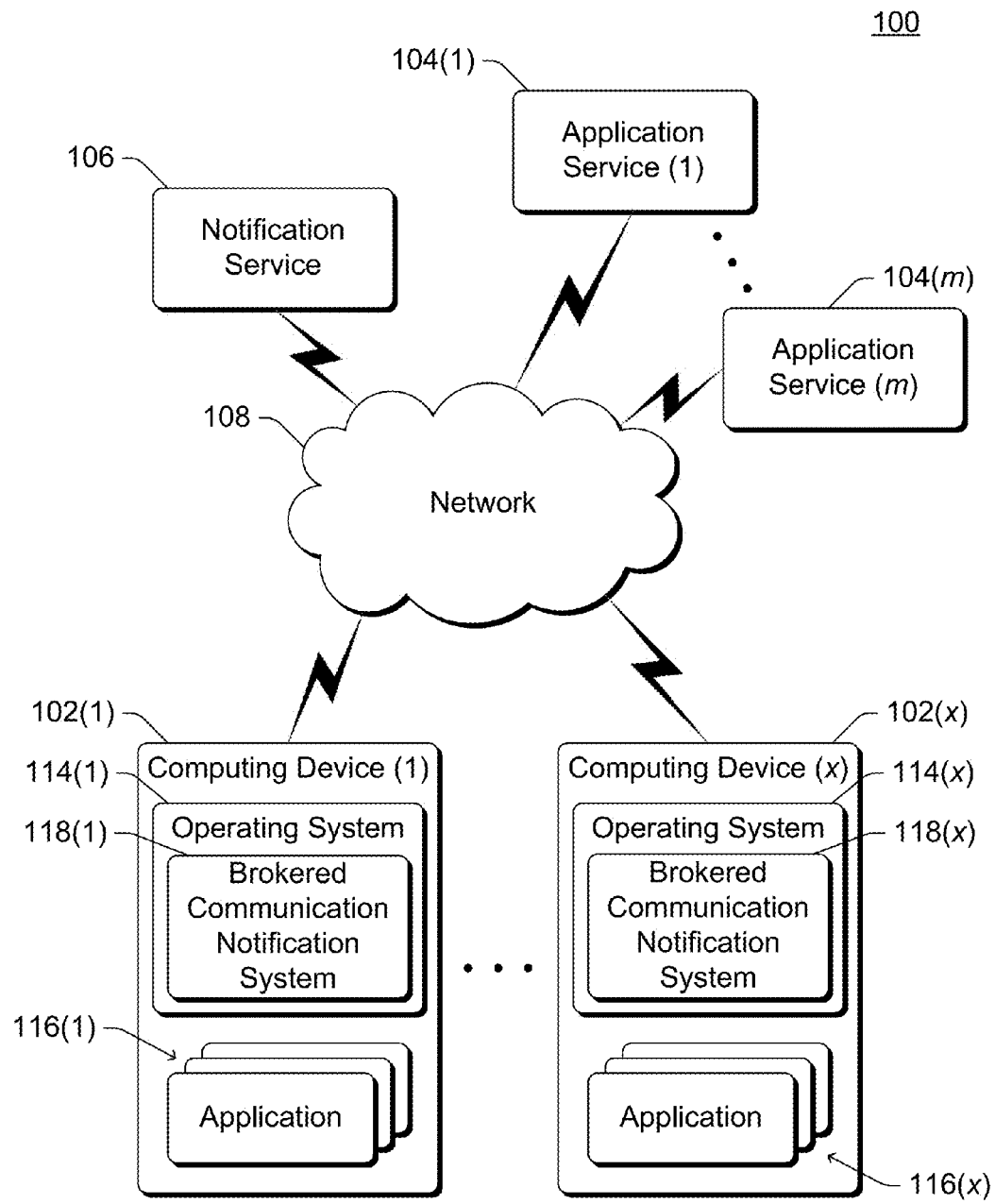
FIG. 1 illustrates an example system implementing the power efficient brokered communication supporting notification blocking in accordance with one or more embodiments.

FIG. 1 illustrates an example system 100 implementing the power efficient brokered communication supporting notification blocking in accordance with one or more embodiments. System 100 includes one or more (x) computing devices 102, one or more (m) application services 104, and a notification service 106 that can communicate with one another via a network 108. Network 108 can be one or more of a variety of different networks, such as the Internet, a local area network (LAN), a public telephone network, an intranet, a personal area network, other public and/or proprietary networks, combinations thereof, and so forth.

Each computing device 102 can be any of a variety of different types of devices, such as a physical device or a virtual device. For example, a computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. A computing device 102 can also be a virtual device, such as a virtual machine running on a physical device. A virtual machine can be run on any of a variety of different types of physical devices (e.g., any of the various types listed above). Thus, computing devices 102 may range from full resource devices with substantial memory and processor resources (e.g., personal computers, game consoles) to low-resource devices with limited memory and/or processing resources (e.g., traditional set-top boxes, hand-held game consoles). Multiple ones of different computing devices 102 can be the same and/or different types of devices.

Services 104 and 106 can each be implemented using one or more of a variety of different types of computing devices. Similar to the discussion of computing devices 102, these different types of computing devices can range from full resource devices with substantial memory and processor resources to low-resource devices with limited memory and/or processing resources.

Each computing device 102 includes an operating system 114. Operating system 114 is configured to abstract underlying functionality of computing device 102 to one or more applications 116 that are executable on computing device 102. For example, operating system 114 may abstract processing, memory, network, file system, user interface (UI), display and/or or other presentation functionality of computing device 102 such that applications may be written without knowing "how" this underlying functionality is implemented. Each application 116, for instance, may provide data to operating system 114 to be rendered and displayed by a display device without understanding how this rendering will be performed.

Operating system 114 and applications 116 can receive user inputs from a user of computing device 102. User inputs can be provided in a variety of different manners, such as by pressing one or more keys of a keypad or keyboard of device 102, pressing one or more keys of a controller (e.g., remote control device, mouse, trackpad, touchpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, touchpad, etc.) of device 102. User inputs can also be provided via other physical feedback input to device 102, such as tapping any portion of device 102, bending or twisting device 102, an action that can be recognized by a motion detection component of device 102 (such as shaking device 102, rotating device 102, etc.), and so forth. User inputs can also be provided in other manners, such as via voice or other audible inputs to a microphone, via motions of hands or other body parts observed by an image capture device, and so forth.

Operating system 114 is also illustrated as including a brokered communication notification system 118. Application services 104 provide data to notification service 106 targeting applications 116 on particular computing devices 102. The application 116 to which particular data is provided by an application service 104 is also referred to as the target application. Notification service 106 receives this data and provides a notification that includes this data to the appropriate computing device 102, operating as a broker (e.g., an intermediary) for communications between application service 104 and application 116. Brokered communication notification system 118 on that computing device 102 receives the notification and provides the notification to the appropriate application 116, assuming the application 116 is allowed to run on the computing device 102 as discussed in more detail below. Brokered communication notification system 118 can also communicate a blocked indication and/or an unblocked indication to notification service 106. A blocked indication indicates that a particular one of more applications 116 are not to be sent notifications, and can be communicated to notification service 106 at various times (such as in response to a notification received from notification service 106) as discussed in more detail below. In response to a blocked indication, notification service 106 ceases providing notifications (blocks notifications) targeting those particular one of more applications 116 until an unblocked indication for those particular one or more applications 116 is received. These blocking and unblocking indications are discussed in more detail below.

Notification service 106 can provide notifications to computing devices 102 in a variety of different manners. Notification service 106 can be, for example, a Windows® Push Notification Service (WNS). Additional information regarding WNS is available from Microsoft® Corp. of Redmond, Wash. In one or more embodiments, notification service 106 provides notifications to computing devices 102 using a push model (e.g., as supported by WNS). Using the push model, notification service 106 stores notifications including data received from application services 104 in a notification queue, and sends the notifications in the queue to computing device 102 in response to a triggering event. The triggering event for sending the notifications can take various forms, such as expiration of a batch interval, reaching a queue threshold, receiving a high priority notification, and so forth. In some situations notifications may also bypass the notification queue, such as if computing device 102 is in a state where power savings (e.g., battery life) is unimportant, if a type of the notification indicates that the notification queue is to be bypassed, and so forth. Thus, notification service 106 can send notifications asynchronously, and computing device 102 need not (and typically does not) know when the next notification will be received from service 106. Alternatively, other models can be used, such as a polling model in which computing devices 102 query notification service 106 at various intervals to check for notifications.

In one or more embodiments, for each computing device 102, a single communication link or connection is established between notification service 106 and the computing device 102. Notifications including data received from multiple different application services 104 targeting any of the applications 116 on a particular computing device 102 are communicated to that particular computing device 102 via the single communication link or connection. Although different communication channels can be established as discussed in more detail below, notifications for these different communication channels are multiplexed onto the single communication link or connection. Thus, a computing device 102 need not expend power to maintain multiple communication links or connections between that computing device 102 and notification service 106 regardless of the number of application services 104 sending data to applications 116 via the notification service 106 and regardless of the number of applications 116 on that computing device 102. Although discussed with reference to a single communication link or connection between notification service 106 and computing device 102, alternatively multiple (although typically less than a threshold number) communication links or connections can be used to provide notifications to a computing device 102.

Additionally, although brokered communication notification system 118 is discussed with reference to incorporation of system 118 in operating system 114, functionality of system 118 can be implemented at least in part in one or more other modules of computing device 102 or another device. For example, an additional module included as part of computing device 102 but external to operating system 114 can implement at least part of brokered communication notification system 118. By way of another example, system 112 can be implemented at least in part by the device of notification service 106.

Applications 116 can also communicate directly with an application service 104, allowing applications 116 to receive data from an application service 104 while bypassing notification service 106 and brokered communication notification system 118. In one or more embodiments, all (or a large portion of) communications from application service 104 are sent by way of notification service 106. Alternatively, notifications with a small amount of data (e.g., no more than a threshold amount of data) are sent by way of notification service 106, and larger amounts of data (e.g. greater than the threshold amount of data) are sent directly to application 116 by passing notification service 106.

Although applications 116 can communicate directly with application services 104, notification service 106 can still be used to facilitate this communication. Application services 104 need not be configured to maintain persistent communication connections or links with applications 116, but can rely on notification service 106 to notify applications 116 when a communication or link between the application and an application service 104 is to be established. For example, application service 104 can send a notification to an application 116 by way of notification service 106, informing the application 116 that an event has occurred for which the application 116 should check the application service 104. This event can take various forms depending on the application 116 and the application service 104, such as an input from another user, a change to a document, a request from another device or service, and so forth. In response to such a notification, the application 116 establishes a communication connection or link with or otherwise accesses the application service 104 to respond to the event. After responding to the event, the communication connection or link between the application 116 and the application service 104 can be terminated (although the communication connection or link between notification service 106 and the computing device 102 executing that application 116 remains).

Figure 2:
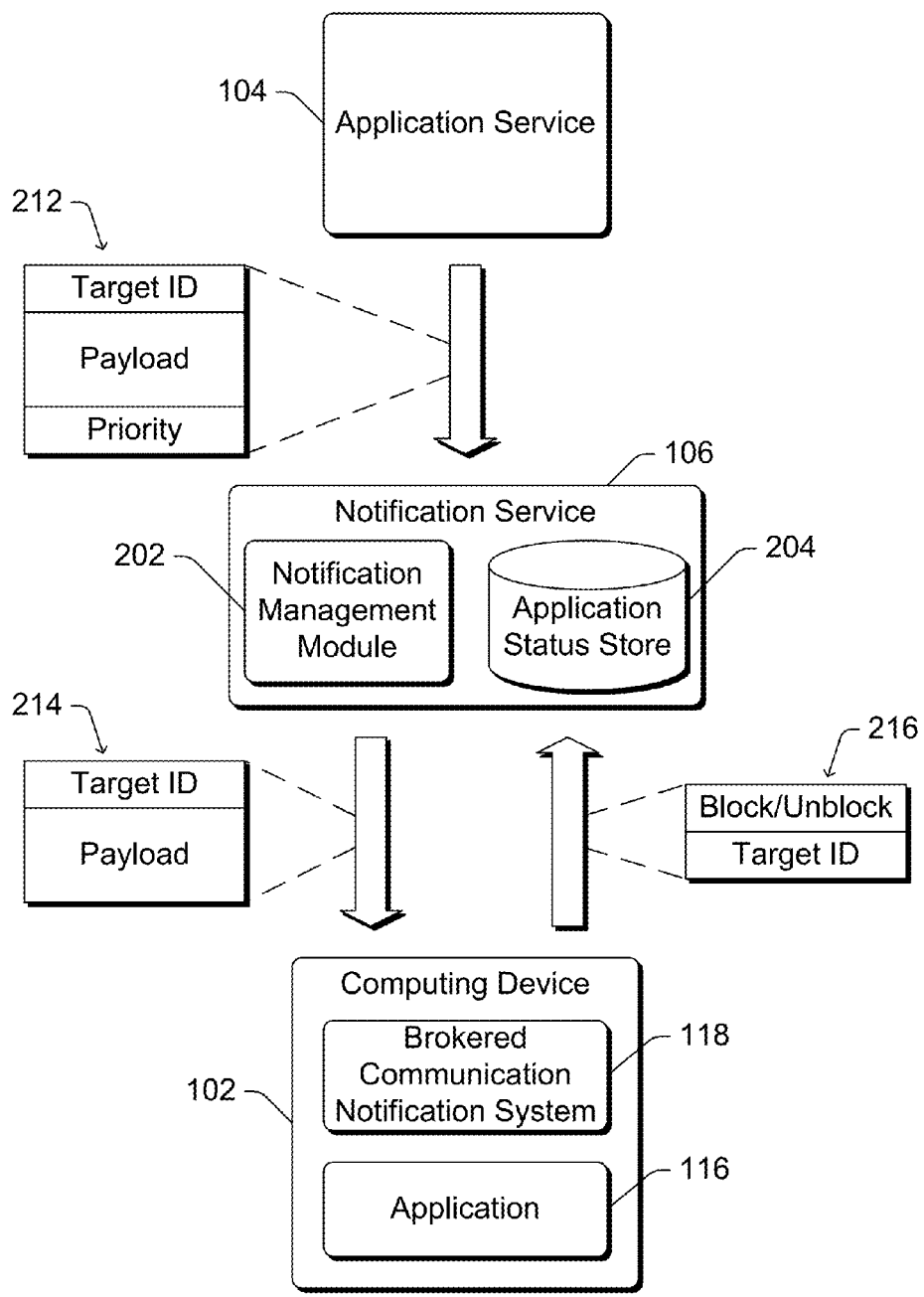
FIG. 2 illustrates another example system implementing the power efficient brokered communication supporting notification blocking in accordance with one or more embodiments.

FIG. 2 illustrates another example system 200 implementing the power efficient brokered communication supporting notification blocking in accordance with one or more embodiments. System 200 illustrates aspects of system 100 of FIG. 1 in additional detail, and includes an application service 104, a notification service 106, and a computing device 102 having a brokered communication notification system 118 and application 116, as discussed above with reference to FIG. 1. Notification service 106 includes a notification management module 202 and an application status store 204.

When an application service 104 desires to send data to application 116 (e.g., which is then also referred to as the target application), service 104 sends a message 212 to notification service 106. Message 212 includes a target identifier (ID) portion, a payload portion, and optionally a priority portion. The target ID portion identifies application 116 on computing device 102. The payload portion includes the data that service 104 desires to send to application 116. The priority portion indicates to notification service 106 a priority level of message 212 (or of the data in the payload portion of message 212).

Notification management module 202 receives message 212 and generates a notification 214 based on message 212. Notification 214 includes a target ID portion that identifies application 116 on computing device 102 as the target of notification 214 (and which can include at least part of the target ID portion from message 212). The target ID identifies a particular computing device and a particular application on the computing device, and optionally a particular user of the computing device. The target ID can be a single value encompassing multiple identifications (e.g., identification of the particular computing device, identification of the particular application, and identification of the particular user), or can be multiple separate values for identifications (e.g., three ID values: a device ID identifying the particular computing device, an application ID identifying the particular application, and a user ID identifying the particular user).

Notification 214 also includes a payload portion, which includes the data in the payload portion of message 212. Notification service 106 need not be concerned with the nature of the data in the payload portion of message 212; rather notification service 106 simply passes the data on to the computing device 102 in notification 214 without altering the data. Notification management module 202 can determine when to send notification 214 to computing device 102 in various manners as discussed above. The priority level indicated in message 212 can optionally be used in making this determination (e.g., data in higher priority level messages may be communicated to computing device 102 more quickly than data in lower priority level messages). Although message 212 and notification 214 are illustrated in FIG. 2 as being different (e.g., one including an optional priority portion and the other not), alternatively notification 214 can be message 212. For example, notification service 106 can pass through message 212 to computing device 102 without altering message 212.

Brokered communication notification system 118 can also communicate an indication 216 to notification service 106 to block or unblock notifications for application 116. Indication 216 includes a command portion indicating to block or unblock notifications, and a target ID portion identifying application 116 on computing device 102. Notification service 106 maintains an application status store 204 in which information that identifies the status of applications on computing devices is stored. This status refers to whether notifications for the applications are blocked and/or unblocked. For example, store 204 can maintain a list or other record identifying particular applications on particular computing devices for which notifications are blocked. By way of another example, store 204 can maintain a list or other record identifying particular applications on particular computing devices for which notifications unblocked.

It should be noted that different copies of the same application (e.g., the same program) on different computing devices or on the same computing device but associated with different users are treated separately and can have different application statuses. For example, notifications for an application on one computing device can be blocked while notifications for another copy of the same application on another computing device can be unblocked. By way of another example, notifications for an application associated with one user on one computing device can be blocked while notifications for another instance of the same application on the same computing device but associated with a different user can be unblocked.

Notification service 106 uses application status store 204 in determining if and/or when to send a notification 214 to computing device 102. Prior to sending notification 214 targeting application 116 to computing device 102, notification service 106 checks application status store 204 to determine whether notifications for application 116 on computing device 102 (e.g., as identified by the target ID portion of message 212 and/or notification 214) are blocked. If notifications for application 116 on computing device 102 are not blocked, then notification service 106 sends notification 214 to computing device 102.

However, if notifications for application 116 on computing device 102 are blocked, then notification service 106 does not send notification 214 to computing device 102. Notification service 106 can store notification 214 (and/or message 212) until notifications for application 116 are unblocked, or alternatively can delete or otherwise ignore notification 214 and message 212. In one or more embodiments, if a notification 214 and/or message 212 is stored or deleted, an indication of such is returned to the application service 104 from which message 212 was received, thereby informing that service 104 that the data in the message has been stored or deleted rather than sent to the target application. Alternatively, if a notification 214 and/or message 212 is stored or deleted, no indication of such need be returned to the application service 104 from which message 212 was received.

The target ID can be determined in a variety of different manners. In one or more embodiments, application 116 submits a request to brokered communication notification system 118 for a communication channel. In response, notification system 118 and/or notification service 106 generates an identifier (e.g., a Uniform Resource Indicator (URI)) that allows service 106 and system 118 to distinguish communication channels from one another. This identifier is returned to application 116, which in turn communicates the identifier to application service 104. This identifier serves as the communication channel and is used as the target ID for message 212 and notification 214. Thus, each instance of an application on a computing device is assigned its own identifier, so different instances of the same application on the same computing device and/or different computing devices will have different identifiers.

Alternatively, the target ID can be determined in other manners. For example, different computing devices 102 (and/or users of computing devices 102) can be assigned a device and/or user ID, and each application 116 can be assigned an application ID. This combination of device ID (and/or user ID) and application ID can be used to distinguish applications on different computing devices (or different instances of applications on the same computing device) from one another.

Figure 3:
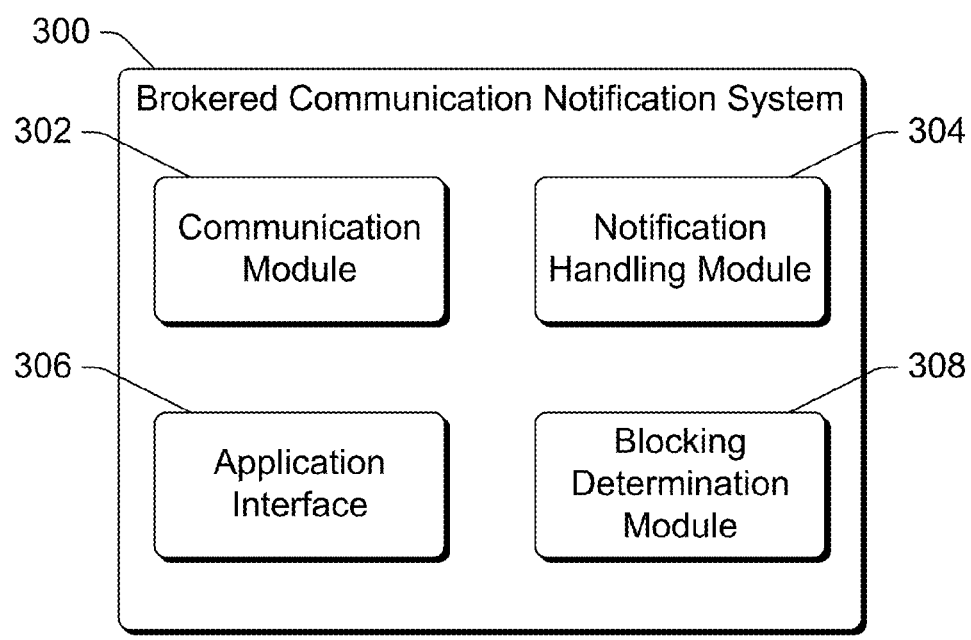
FIG. 3 illustrates an example brokered communication notification system in accordance with one or more embodiments.

FIG. 3 illustrates an example brokered communication notification system 300 in accordance with one or more embodiments. Brokered communication notification system 300 can be, for example, a brokered communication notification system 118 of FIG. 1 or FIG. 2. Notification system 300 includes a communication module 302, a notification handling module 304, an application interface 306, and a blocking determination module 308. Although modules 302-308 are illustrated as separate modules, alternatively multiple ones of modules 302-308 can be implemented together as a single module. Additionally and/or alternatively, the functionality of one or more of modules 302-308 can be separated into multiple modules.

Communication module 302 manages communication between brokered communication notification system 300 and the notification service (e.g., notification service 106 of FIG. 1 or FIG. 2). Communication module 302 receives notifications from the notification service and provides the received notifications to notification handling module 304. Communication module 302 also sends communication channel requests received from applications on the computing device to the notification service. Communication module 302 also sends indications to block and/or unblocked notifications for particular applications based on requests from blocking determination module 308 as discussed in more detail below.

Application interface 306 is an interface allowing applications (e.g., applications 116 of FIG. 1 or FIG. 2) to submit requests to brokered communication notification system 300. In one or more embodiments, application interface 306 is an application programming interface (API) exposing one or more methods that can be invoked by the applications. Alternatively, various other data communication techniques can be employed to submit requests to notification system 300, such as writing data describing the requests in a common storage location accessible to both notification system 300 and the applications, sending data describing the requests via various messaging or event communication systems, and so forth.

In one or more embodiments, an application submits a request to brokered communication notification system 300 via application interface 306 for a communication channel. Notification system 300 returns an identifier (e.g., a URI) to the application that serves as the communication channel as discussed above. Additionally, the application provides a callback that is maintained by notification system 300 (e.g., by notification handling module 304). The callback is used by notification handling module 304 to provide to the application notifications that are received from the notification service and that target the application. The callback can take various forms, such as a function or procedure that is invoked, a method of an API exposed by the application that is invoked by system 300, and so forth.

Notification handling module 304 manages providing each notification received from the notification service to the proper application (the application identified by (targeted by) the notification). Notification system 300 is aware of the identifier for each application (e.g., having provided the identifier serving as the communication channel to the application). For an application, notification system 300 maintains the identifier for the application and associates with that identifier an indication of how to provide notifications to the application (e.g., the callback provided by the application). Thus, when a notification is received from the notification service, notification handling module 304 can readily identify how to provide the notification to the identified application. Whether the notification is actually provided to the application depends on whether the application is allowed to run as determined by blocking determination module 308 and as discussed in more detail below.

Returning to FIG. 1, in one or more embodiments operating system 114 implements various power saving functionality. Part of this power saving functionality is to reduce the number of applications that are running at any given time. Operating system 114 can terminate an application or suspend an application (e.g., the application may remain in memory of computing device 102 but is not scheduled for execution by the processor of computing device 102) at various times based on any of a variety of different criteria.

Part of this power saving functionality is also to restrict the number of applications that can run in the background. An application displaying data on a screen or other display device of computing device 102 at a particular point in time is referred to as a foreground application at that particular point in time. Other applications that are not displaying data on the screen or other display device of computing device 102 at that particular point in time are referred to as background applications at that particular point in time. It should be noted that over time different applications can switch between being foreground applications and being background applications.

Operating system 114 permits only particular applications 116 to run as background applications; other applications 116 are not permitted to run as background applications and will not be run by operating system 114 unless a user request to run the applications (and thus making them foreground applications) is received. It should be noted that the instructions of a background application that is not permitted to run as a background application can remain in memory, but the instructions are not scheduled for execution by a processor of computing device 102 (e.g., the application is suspended). Operating system 114 can be configured with an indication of which applications 116 are permitted to run as background applications, or can determine which applications 116 are permitted to run as background applications in other manners (e.g., obtain an indication of which applications 116 are permitted to run as background applications from another device or service, determine which applications 116 are permitted to run as background applications by applying particular rules or criteria, and so forth).

In one or more embodiments, applications 116 are referred to as background enabled applications (applications that are background enabled) or non-background enabled applications (applications that are not background enabled). A background enabled application refers to an application that is permitted to run as a background application, and a non-background enabled application refers to an application that is not permitted to run as a background application.

Referring again to FIG. 3, when brokered communication notification system 300 receives a notification from the notification service, the notification targets an application as discussed above. This target application can be an application that is currently running (e.g., a foreground application) or a background application. If the application is a background application, then it can be a background enabled application or a non-background enabled application. Applications that are currently running are also referred to as applications that are allowed to run because they are currently running Background applications that are background enabled are also referred to as applications that are allowed to run because the operating system permits the applications to run as background applications. However, background applications that are non-background enabled are also referred to as applications that are not allowed to run because the operating system does not permit the applications to run as background applications.

In response to receiving a notification from the notification service, blocking determination module 308 determines whether the target application of the notification is allowed to run. If the target application is not allowed to run, blocking determination module 308 directs communication module 302 to send an indication to the notification service that notifications for the target application are to be blocked. Communication module 302 sends this indication (e.g., an indication 216 of FIG. 2) to the notification service, resulting in the notification service sending no more notifications for the target application to the computing device as discussed above.

Blocking determination module 308 maintains a record that an indication to block notifications for the target application was sent to the notification service. If the target application were to be run (e.g., in response to a user request to run the application) or otherwise become allowed to run (e.g., in response to a user input indicating that the application is background enabled), then the target application becomes an application that is allowed to run. Accordingly, blocking determination module 308 directs communication module 302 to send an indication to the notification service that notifications for the target application are no longer to be blocked (e.g., are to be unblocked). Communication module 302 sends this indication (e.g., an indication 216 of FIG. 2) to the notification service, resulting in the notification service resuming sending notifications for the target application to the computing device as discussed above. It should be noted that if no block notification for the target application was previously sent to the notification service (e.g., since the target application started running or an unblock notification was last sent to the notification service for the target application), then no unblock notification need be sent to the notification service when the target application becomes an application that is allowed to be run. For example, the target application can be a non-background enabled application that stops running (e.g., due to a user request to run another application), and then later resumes running (e.g., due to a user request to run the target application). In this example, if no notifications are received between the time the target application stops running and resumes running, then no unblock notification need be sent to the notification service.

Blocking determination module 308 can determine when an application is run in various manners. For example, module 308 can obtain an indication of an application that is running from one or more modules of an operating system of the computing device (e.g., operating system 114 of FIG. 1), by monitoring various events or messages on the computing device, and so forth. Thus, module 308 can readily determine when an application for which an indication to block notifications was sent to the notification service is run, and thus that an indication is to be sent to the notification service that notifications for the target application are no longer to be blocked.

Notification handling module 304 communicates with blocking determination module 308. If blocking determination module 308 determines that the target application is not allowed to run, then notification handling module 304 does not provide the notification to the target application. Notification handling module 304 can delete or otherwise ignore the notification, or alternatively store the notification until the target application is running and provide the notification to the target application at that time. However, if blocking determination module 308 determines the target application is allowed to run, then notification handling module 304 provides the notification to the target application.

Thus, if the notification received by brokered communication notification system 300 targets an application that is running or that is background enabled, notification system 300 provides the notification to the target application. If the target application is not running but is background enabled, then notification system 300 wakes up (resumes or otherwise starts running) the target application. The target application can then process the data included in the notification as the application sees fit. However, if the target application is not running and is not background enabled, then the notification is not provided to the target application. Furthermore, an indication is provided to the notification service that notifications for the target application are to be blocked so that no additional notifications are sent to that computing device for that target application. The notification service thus blocks notifications for the target application on the computing device. By blocking notifications for the target application, additional data bandwidth between the notification service and the computing device need not be consumed for notifications that will not be delivered to the target application by notification system 300. Also, by blocking notifications for the target application, the computing device need not expend power to receive notifications that will not be delivered to the target application by notification system 300.

In the discussions above, brokered communication notification system 300 is discussed as providing an indication to the notification service to block notifications for an application in response to receiving a notification for the application. In these discussions, the block notification is not sent to the notification service until a notification is received for an application that is not allowed to run—a block notification is not sent to the notification service simply because an application stops running. Alternatively, notification system 300 can provide indications to block or unblock notifications for applications proactively. For example, each time a non-background enabled application is run, notification system 300 can provide an indication to the notification service to unblock notifications for that application. Additionally, each time a non-background enabled application is no longer running (and is a background application), notification system 300 can provide an indication to the notification service to block notifications for that application. By way of another example, in situations in which all applications are known to be not allowed to run, notification system 300 can provide a "block all" indication to the network service indicating that all of the applications are to be blocked. Similarly, in situations in which all applications are known to be allowed to run, notification system 300 can provide an "unblock all" indication to the network service indicating that all of the applications are to be unblocked.

Returning to FIG. 2, system 200 sending indications, in response to notifications, to block notifications for applications that are not allowed to run provides robust brokered communication functionality. If notification service 106 were to experience a power failure or other hardware and/or software error, significant harm on system 200 is avoided despite the possible deletion or other loss of information in application status store 204. Notification service 106 continues to operate as discussed above, and receives block notifications for applications as appropriate from computing device 102, thus repopulating or rebuilding the appropriate information in application status store 204 regarding which applications are blocked and/or unblocked.

Similarly, in one or more embodiments notification service 106 maintains information identifying the status of an application in application status store 204 for a threshold amount of time. This threshold amount of time can be a fixed amount of time (e.g., a particular number of hours, a particular number of days, etc.), or can be a variable amount of time based on other events or criteria (e.g., no message from an application service 104 targeting the application has been received for a particular number of hours, a particular number of days, etc.). After this threshold amount of time elapses, the information indicating the status of the application is deleted from store 204. Notification service 106 continues to operate as discussed above, and if service 106 sends a notification to computing device 102 for an application the status of which was removed from store 204, then service 106 will receive a block notification for the application from computing device 102 allowing service 106 to rebuild the deleted information. By not maintaining the status of applications on computing devices for more than the threshold amount of time (particularly for applications that are not actively receiving notifications), notification service 106 can reduce the storage space used by application status store 204.

Furthermore, in one or more embodiments, the information identifying the statuses of applications on a particular computing device is deleted from application status store 204 each time computing device 102 disconnects from notification service 106. This disconnection can take various forms, such as computing device 102 shutting down, computing device 102 logging out of notification service 106, the communication link or connection between computing device 102 and notification service 106 being terminated, and so forth. Notification service 106 thus need not maintain information identifying the statuses of applications on computing devices that have disconnected from notification service 106, reducing the storage space used by application status store 204 and reducing situations in which notification service 106 may become out of synchronization with computing device 102.

Additionally, application service 104 need have no knowledge of whether application 116 is background enabled or non-background enabled. Alternatively, in one or more embodiments application service 104 is aware of whether application 116 is background enabled or non-background enabled and provides an indication (e.g., as part of message 212 of FIG. 2) of such to notification service 106. Notification service 106 can maintain (e.g., in application status store 204) a record of which applications are background enabled and which applications are non-background enabled and use this record in various manners.

For example, if a display device of computing device 102 is powered off then notification system 118 can assume that no application can be a foreground application, and thus that no non-background enabled application can be running. Accordingly, notification system 118 sends an indication 216 to notification service 106 that notifications for all non-background enabled applications on computing device 102 are to be blocked. When the display device is subsequently powered on, notification system 118 can send an indication 216 to notification service 106 that the notifications for a non-background enabled application that is running are to be unblocked as discussed above.

In other alternatives, application service 104 need have no knowledge of whether application 116 is background enabled or non-background enabled, but notification service 106 can nonetheless be aware of whether application 116 is background enabled or non-background enabled. The knowledge of whether application 116 is background enabled or non-background enabled can be obtained in different manners. For example, when obtaining a communication channel for application 116, notification system 118 can provide an indication to notification service 106 of whether application 116 is background enabled or non-background enabled. Notification service 106 can maintain (e.g., in application status store 204) a record of which applications are background enabled and which applications are non-background enabled and use this record in various manners as discussed above.

Various power efficiencies can be obtained using the techniques discussed herein. Power is not expended to communicate numerous notifications to a computing device for target applications that are not allowed to run. Additionally, a computing device need not expend power to maintain multiple communication links or connections between applications on the computing device and application services, but can rely on notifications from the notification service to inform the applications when a communication link or connection with an application service is to be established.

Figure 4:
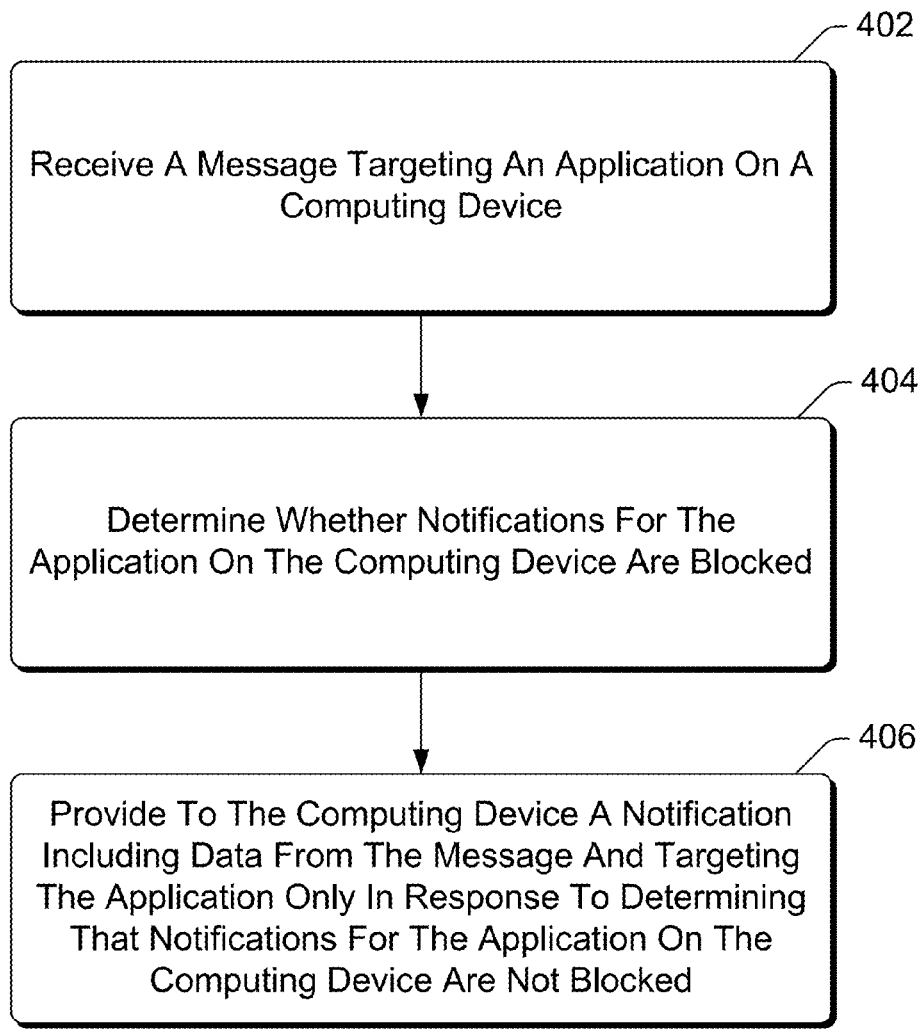
FIG. 4 is a flowchart illustrating an example process for implementing the power efficient brokered communication supporting notification blocking in accordance with one or more embodiments.

FIG. 4 is a flowchart illustrating an example process 400 for implementing the power efficient brokered communication supporting notification blocking in accordance with one or more embodiments. Process 400 is carried out by a notification service, such as notification service 106 of FIG. 1 or FIG. 2, and can be implemented in software, firmware, hardware, or combinations thereof. Process 400 is shown as a set of acts and is not limited to the order shown for performing the operations of the various acts. Process 400 is an example process for implementing the power efficient brokered communication supporting notification blocking; additional discussions of implementing the power efficient brokered communication supporting notification blocking are included herein with reference to different figures.

In process 400, a message targeting an application of a computing device is received (act 402). The message is received from an application service and includes data intended for the application, as discussed above.

A determination is made as to whether notifications for the application on the computing device are blocked (act 404). The determination is made based at least in part on a previously received indication from the computing device indicating that notifications for the application are to be blocked or unblocked, as discussed above.

A notification targeting the application and including the data from the message is provided to the computing device only in response to determining that notifications for the application on the computing device are not blocked (act 406). If notifications for the application on the computing device are blocked, then the notification is not provided to the computing device.

Figure 5:
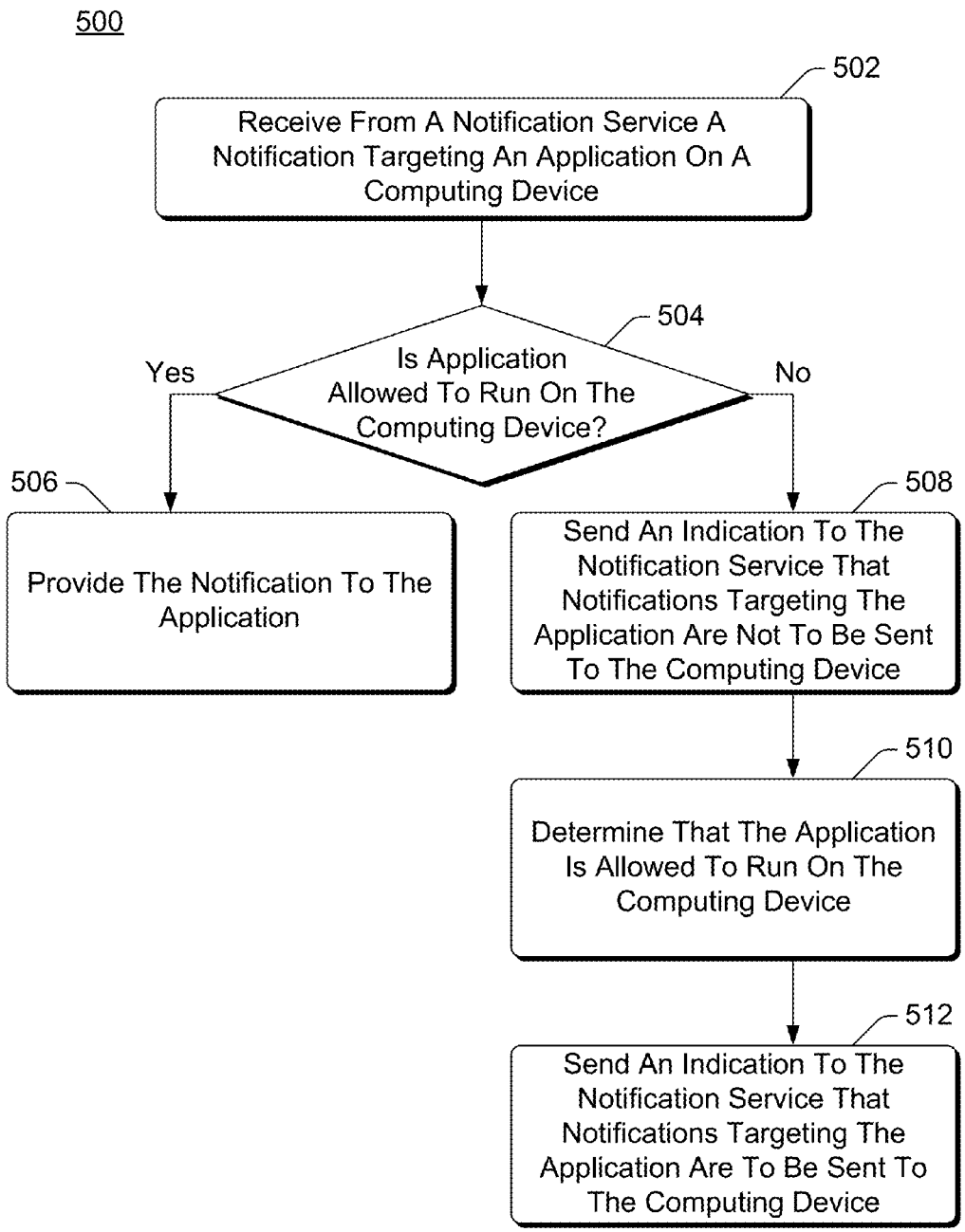
FIG. 5 is a flowchart illustrating another example process for implementing the power efficient brokered communication supporting notification blocking in accordance with one or more embodiments.

FIG. 5 is a flowchart illustrating an example process 500 for implementing the power efficient brokered communication supporting notification blocking in accordance with one or more embodiments. Process 500 is carried out by a brokered communication notification system implemented by a computing device, such as brokered communication notification system 118 of FIG. 1 or FIG. 2, or brokered communication notification system 300 of FIG. 3, and can be implemented in software, firmware, hardware, or combinations thereof. Process 500 is shown as a set of acts and is not limited to the order shown for performing the operations of the various acts. Process 500 is an example process for implementing the power efficient brokered communication supporting notification blocking; additional discussions of implementing the power efficient brokered communication supporting notification blocking are included herein with reference to different figures.

In process 500, a notification targeting an application is received at the computing device from a notification service (act 502). The notification targets one of multiple applications on the computing device.

A determination is made as to whether the application is allowed to run on the computing device (act 504). In one or more embodiments, the application is allowed to run on the computing device if the application is running or is permitted to run as a background application on the computing device, and the application is not allowed to run on the computing device if the one application is not running and is not permitted to run as a background application on the computing device as discussed above.

If the application is allowed to run on the computing device, then the notification is provided to the application (act 506). If the application is not already running, then the application is woken up and begins running to process the data in the notification. The notification can be provided to the application in different manners, such as using a callback as discussed above.

However, if the application is not allowed to run on the computing device, then a blocked indication is sent to the notification service (act 508). The blocked indication indicates to the notification service that notifications targeting the application are not to be sent to the computing device as discussed above.

After sending the blocked indication to the notification service, the determination can be made that the one application is allowed to run on the computing device (act 510). This determination can be made in various manners, for example, in response to various user inputs (e.g., a user request to run the application, a user request to change a configuration setting so that the application is background enabled, etc.) as discussed above.

In response to the determination that the one application is allowed to run on the computing device, an unblocked indication is sent to the notification service (act 512). The unblocked indication indicates to the notification service that notifications targeting the application are to be sent to the computing device as discussed above.

Various actions such as communicating, receiving, sending, maintaining, storing, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
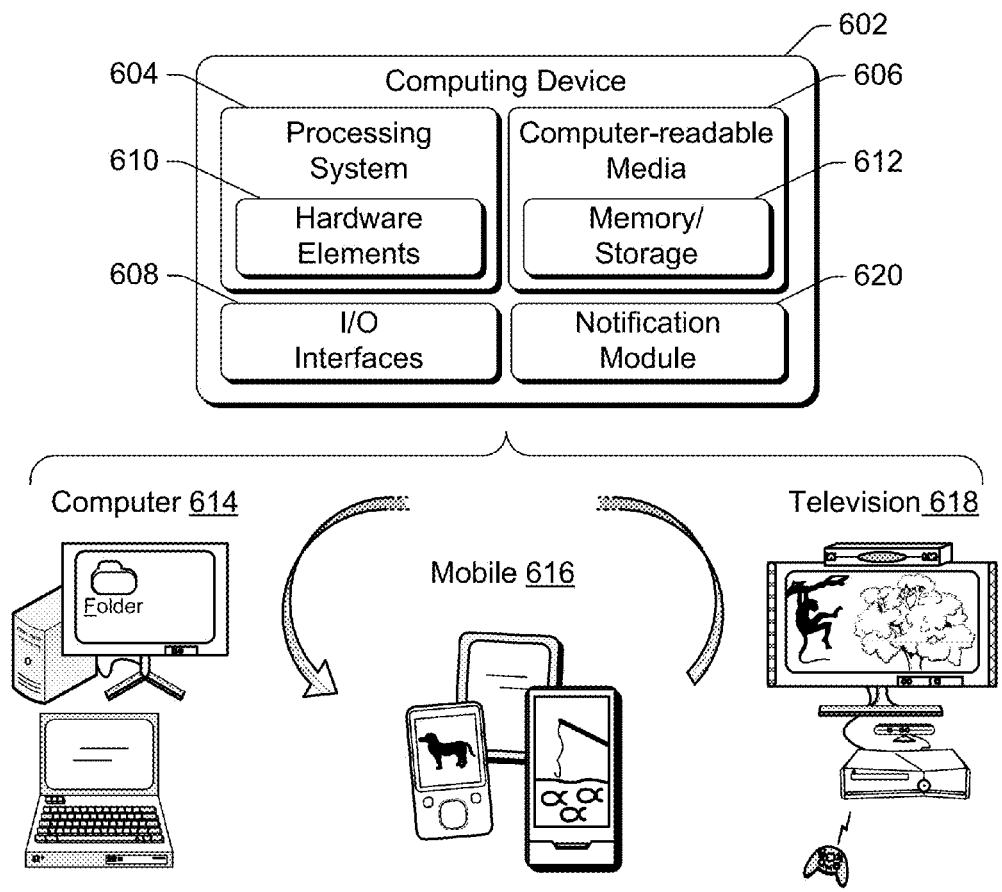
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. The computing device 602 may be, for example, a device associated with a user (e.g., a computing device 102 of FIG. 1 or FIG. 2), a server or other device of a service (e.g., of a service 106 or 104 of FIG. 1 or FIG. 2), an on-chip system, and/or any other suitable computing device or computing system.

Computing device 602 as illustrated includes a processing system 604, one or more computer-readable media 606, and one or more I/O Interfaces 608 that are communicatively coupled to one another. Although not shown, computing device 602 may further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable media 606 is illustrated as including memory/storage 612. Memory/storage 612 represents memory/storage capacity associated with one or more computer-readable media. Memory/storage 612 may include volatile media (such as random access memory (RAM)) and/or nonvolatile media (such as read only memory (ROM), Flash memory, optical disks, magnetic disks, and so forth). Memory/storage 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, a tactile-response device, and so forth. Thus, computing device 602 may be configured in a variety of ways as further described below to support user interaction.

Computing device 602 also includes a notification module 620. Notification module 620 can be, for example, brokered communication notification system 118 of FIG. 1 or FIG. 2, or brokered communication notification system 300 of FIG. 3. By way of another example, notification module 620 can be a notification service 106 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. Computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

In various implementations, computing device 602 may assume a variety of different configurations, such as for computer 614, mobile 616, and television 618 uses. Each of these configurations includes devices that may have generally different constructs and capabilities, and thus computing device 602 may be configured according to one or more of the different device classes. The techniques described herein may be supported by these various configurations of computing device 602 and are not limited to the specific examples of the techniques described herein. For instance, computing device 602 may be implemented as the computer 614 class of a device that includes a personal computer, desktop computer, a multi-screen computer, laptop computer, netbook, and so on.

Computing device 602 may also be implemented as the mobile 616 class of device that includes mobile devices, such as a mobile phone, portable music player, portable gaming device, a tablet computer, a multi-screen computer, and so on. Computing device 602 may also be implemented as the television 618 class of device that includes devices having or connected to generally larger screens in casual viewing environments. These devices include televisions, set-top boxes, gaming consoles, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a notification service, the method comprising:
   receiving at the notification service, from an application service, a message targeting one of multiple applications on a computing device, the notification service and the application service each being implemented on different devices that are each separate from the computing device;
   maintaining at the notification service, while there is a single persistent communication connection between the computing device and the notification service, information that identifies statuses for the multiple applications on the computing device, based at least in part on previously received indications from the computing device of ones of the multiple applications for which notifications are blocked and ones of the multiple applications for which notifications are unblocked, the previously received indications received over the single persistent communication connection, one of the previously received indications comprising an indication, received from the computing device, to block notifications for a particular application, the one previously received indication having been received in response to the particular application not running on the computing device and the particular application not being permitted to run as a background application on the computing device;
   determining, based at least in part on a status for one of multiple applications, whether notifications for the one application on the computing device are blocked; and
   providing from the notification service, to the computing device over the single persistent communication connection, a notification targeting the one application and including data from the message only in response to determining that notifications for the one application on the computing device are not blocked.

2. A method as recited in claim 1, further comprising ignoring the message in response to determining that notifications for the one application on the computing device are blocked.

3. A method as recited in claim 1, another one of the previously received indications comprising an indication, received from the computing device, that all applications that are not permitted to run as background applications are to be blocked.

4. A method as recited in claim 1, another one of the previously received indications indicating that notifications for the one application on the computing device are to be blocked due to the one application not being allowed to run on the computing device.

5. A method as recited in claim 1, another one of the previously received indications indicating that notifications for the one application on the computing device are to be unblocked due to the one application running on the computing device or being permitted to run as a background application on the computing device.

6. A method as recited in claim 1, the providing further comprising providing to the computing device, over the single persistent communication connection, multiple notifications targeting multiple applications, the multiple notifications including different data received from different ones of multiple application services communicated to the notification service, the notification service being configured to receive messages from the multiple application services and generate the multiple notifications using a push model or a polling model, the providing to the computing device the multiple notifications targeting multiple applications comprising passing the different data in the messages to the computing device without altering the data.

7. A method as recited in claim 1, further comprising:
   receiving at the notification service, from an application service, the message targeting an additional one of multiple applications on a computing device;
   determining, based at least in part on a previously received indication from the computing device of whether notifications for the additional one of multiple applications are not blocked, whether notifications for the additional one of multiple applications on the computing device are not blocked; and
   providing from the notification service, to the computing device, an additional notification targeting the additional one of multiple applications and including data from the message only in response to determining that notifications for the additional one of multiple applications on the computing device are not blocked.

8. A method as recited in claim 1, further comprising:
   maintaining a store of information indicating whether notifications for the one application on the computing device are blocked; and
   allowing the information in the store to be rebuilt if deleted from the store.

9. One or more computer-readable storage media having stored thereon multiple instructions that, responsive to execution by one or more processors of a first computing device, cause the one or more processors to:
   receive, from a notification service implemented on a second computing device separate from the first computing device, a notification targeting an application of multiple applications on the first computing device, the notification service maintaining, while there is a single persistent communication connection between the first computing device and the notification service, information that identifies statuses for the multiple applications on the first computing device based at least in part on previously received indications from the first computing device of ones of the multiple applications for which notifications are blocked and ones of the multiple applications for which notifications are unblocked;
   determine whether the application is allowed to run on the first computing device;
   provide, in response to determining that the application is allowed to run on the first computing device, the notification to the application; and
   send over the single persistent communication connection, in response to determining that the application is not allowed to run on the first computing device, a blocked indication to the notification service indicating that notifications targeting the application on the first computing device are not to be sent to the first computing device, the determining that the application is not allowed to run on the first computing device comprising determining that the application is not allowed to run in response to the application not running on the computing device and the application not being permitted to run as a background application on the computing device.

10. One or more computer-readable storage media as recited in claim 9, the multiple instructions further causing the one or more processors to:
    determine, after returning the blocked indication to the notification service, that notifications for the application are to be sent to the first computing device; and
    send an unblocked indication to the notification service indicating that notifications targeting the application are to be sent to the first computing device.

11. One or more computer-readable storage media as recited in claim 10, the multiple instructions further causing the one or more processors to determine, in response to the application running on the first computing device, that notifications for the application are to be sent to the first computing device.

12. One or more computer-readable storage media as recited in claim 9, the multiple instructions further causing the one or more processors to determine that the application is allowed to run if the application is currently running.

13. One or more computer-readable storage media as recited in claim 9, the multiple instructions further causing the one or more processors to determine that the application is allowed to run if the application is not currently running but is permitted to run as a background application on the first computing device.

14. One or more computer-readable storage media as recited in claim 9, the multiple instructions further causing the one or more processors to run the application in response to determining that the application is allowed to run on the first computing device.

15. One or more computer-readable storage media as recited in claim 9, the multiple instructions further causing the one or more processors to receive the notification over the single persistent communication connection as multiple additional notifications targeting multiple additional ones of the multiple applications.

16. One or more computer-readable storage media as recited in claim 9, the multiple instructions further causing the one or more processors to send, in response to determining that all applications that are not permitted to run as background applications on the first computing device are to be blocked, an indication to block all applications that are not permitted to run as background applications on the first computing device.

17. A first computing device, comprising at least a memory configured to store executable instructions for a brokered communication notification system and one or more processors configured to execute the instructions for the brokered communication notification system that is configured to:

receive, from a notification service implemented on a second computing device separate from the first computing device, a notification targeting one application of multiple applications on the first computing device, the notification service maintaining, while there is a single persistent communication connection between the first computing device and the notification service, information that identifies statuses for the multiple applications on the first computing device, based at least in part on previously received indications from the first computing device of ones of the multiple applications for which notifications are blocked and ones of the multiple applications for which notifications are unblocked, the previously received indications received over the single persistent communication connection, one of the previously received indications comprising an indication, received from the first computing device, to block notifications for a particular application, the one previously received indication having been received in response to the particular application not running on the computing device and the particular application not being permitted to run as a background application on the computing device;

determine, at the first computing device, whether the one application is allowed to run on the first computing device, the one application being allowed to run on the first computing device if the one application is running or is permitted to run as a background application on the first computing device, and the one application not being allowed to run on the first computing device if the one application is not running and is not permitted to run as a background application on the first computing device;

provide, in response to determining that the one application is allowed to run on the first computing device, the notification to the one application;

send over the single persistent communication connection, in response to determining that the one application is not allowed to run on the first computing device, a blocked indication to the notification service indicating that notifications targeting the one application are not to be sent to the first computing device;

determine, at the first computing device after returning the blocked indication to the notification service, that the one application is allowed to run on the first computing device; and send an unblocked indication to the notification service indicating that notifications targeting the one application are to be sent to the first computing device.

18. A first computing device as recited in claim 17, the brokered communication notification system is further configured to determine, in response to the one application running on the first computing device, that notifications for the one application are to be sent to the first computing device.

19. A first computing device as recited in claim 17, the brokered communication notification system is further configured to run the one application in response to determining that the one application is allowed to run on the first computing device.

20. A first computing device as recited in claim 17, the determining that the one application is not allowed to run on the first computing device comprising determining that the one application is not allowed to run on the first computing device in response to the one application not running on the first computing device and the one application not being permitted to run as a background application on the first computing device.

* * * * *